(12) United States Patent
Nishimura et al.

(10) Patent No.: US 9,493,174 B2
(45) Date of Patent: Nov. 15, 2016

(54) PLATE SPRING UNIT AND RAILCAR BOGIE USING SAME

(71) Applicant: KAWASAKI JUKOGYO KABUSHIKI KAISHA, Kobe-shi, Hyogo (JP)

(72) Inventors: Takehiro Nishimura, Kobe (JP); Shunichi Nakao, Kobe (JP); Masayuki Enomoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 98 days.

(21) Appl. No.: 14/382,300

(22) PCT Filed: Jan. 11, 2013

(86) PCT No.: PCT/JP2013/000092
§ 371 (c)(1),
(2) Date: Aug. 29, 2014

(87) PCT Pub. No.: WO2013/128784
PCT Pub. Date: Sep. 6, 2013

(65) Prior Publication Data
US 2015/0158506 A1 Jun. 11, 2015

(30) Foreign Application Priority Data
Feb. 29, 2012 (JP) ................................ 2012-043135

(51) Int. Cl.
*B61F 5/30* (2006.01)
*B61F 5/52* (2006.01)
(Continued)

(52) U.S. Cl.
CPC . *B61F 5/30* (2013.01); *B61F 3/08* (2013.01); *B61F 5/302* (2013.01); *B61F 5/50* (2013.01); *B61F 5/52* (2013.01); *F16F 1/18* (2013.01)

(58) Field of Classification Search
CPC ................ B61F 5/00; B61F 5/02; B61F 5/04; B61F 5/06
(Continued)

(56) References Cited

U.S. PATENT DOCUMENTS

| 3,948,188 A | * | 4/1976 | Zehnder | ................ B60G 11/04 |
| | | | | 105/167 |
| 6,338,300 B1 | | 1/2002 | Landrot | |
| 7,328,660 B2 | | 2/2008 | Landrot | |

FOREIGN PATENT DOCUMENTS

| EP | 0242552 | * | 10/1987 | ............. B29D 99/00 |
| EP | 0851142 | * | 7/1998 | ............. F16F 1/368 |

(Continued)

OTHER PUBLICATIONS

International Search Report issued in International Patent Application No. PCT/JP2013/000092 mailed Apr. 16, 2013.

*Primary Examiner* — Robert J. McCarry, Jr.
(74) *Attorney, Agent, or Firm* — Oliff PLC (57) ABSTRACT

A railcar bogie includes a cross beam to support a carbody of a railcar, a pair of front and rear axles between which the cross beam is located and arranged, respectively, in front of and behind the cross beam in a railcar longitudinal direction and extending in a railcar width direction, bearings provided at both railcar width direction sides of the axles to rotatably support the axles, axle boxes to respectively accommodate the bearings, and a plate spring extending in the railcar longitudinal direction to support one of both railcar width direction end portions of the cross beam and including both longitudinal direction end portions supported by the axle boxes. The plate spring unit includes a plurality of plate springs to elastically deform in an upper-lower thickness direction. The plate springs are arranged in a line in a width direction perpendicular to the longitudinal direction and the thickness direction.

8 Claims, 7 Drawing Sheets

(51) Int. Cl.
*B61F 3/08* (2006.01)
*B61F 5/50* (2006.01)
*F16F 1/18* (2006.01)

(58) Field of Classification Search
USPC ............ 105/157.1, 182.1, 193, 194, 197.05, 105/197.1, 197.2
See application file for complete search history.

(56) References Cited

FOREIGN PATENT DOCUMENTS

| | | |
|---|---|---|
| JP | A-54-74057 | 6/1979 |
| JP | 55-086935 A | 1/1980 |
| JP | A-55-47950 | 4/1980 |
| JP | A-58-77941 | 5/1983 |
| JP | A-58-118342 | 7/1983 |
| JP | A-59-6443 | 1/1984 |
| JP | 60-229812 A | 11/1985 |
| JP | H60-229812 A | 11/1985 |
| JP | A-3-67746 | 3/1991 |
| JP | A-3-125039 | 5/1991 |
| JP | A-4-54337 | 2/1992 |
| JP | A-4-197873 | 7/1992 |
| JP | U-4-119266 | 10/1992 |
| JP | 05-022881 U | 3/1993 |
| JP | U05-02281 A | 3/1993 |
| JP | B2-2799078 | 9/1998 |

\* cited by examiner

PLATE SPRING UNIT AND RAILCAR BOGIE USING SAME

TECHNICAL FIELD

The present invention relates to a plate spring unit and a railcar bogie which uses the plate spring unit and from which side sills are omitted.

BACKGROUND ART

A bogie for supporting a carbody of a railcar and allowing the railcar to run along a rail is provided under a floor of the carbody. In the bogie, axle boxes each configured to accommodate a bearing for supporting a wheelset are supported by an axlebox suspension so as to be displaceable relative to a bogie frame in an upper-lower direction. For example, in PTL 1, the bogie frame includes a cross beam extending in a crosswise direction and a pair of left and right side sills respectively extending from both end portions of the cross beam in a front-rear direction, and the axlebox suspension includes axle springs constituted by coil springs each provided between the axle box and the side sill located above the axle box. PTL 2 proposes the bogie in which the side sills are omitted from the bogie frame.

CITATION LIST

Patent Literature

PTL 1: Japanese Patent No. 2799078
PTL 2: Japanese Laid-Open Patent Application Publication No. 55-47950

SUMMARY OF INVENTION

Technical Problem

In the bogie of PTL 1, the bogie frame constituted by the cross beam and the side sills is manufactured by, for example, welding heavy steel members to one another. Therefore, problems are that the weight of the bogie frame becomes heavy, and the cost for the steel members and the assembly cost become high. In contrast, the bogie of PTL 2 is configured such that: plate springs are used as primary suspensions; front-rear direction middle portions of the plate springs are respectively fixed to both railcar width direction end portions of a cross beam; and both front-rear direction end portions of each of the plate springs are respectively inserted in spring receiving portions of axle boxes. According to this configuration, since side sills of the bogie frame are omitted, the bogie frame is reduced in weight, and the assembling operation is simplified.

However, in the case of the bogie of PTL 2, if one of the left and right plate springs is damaged, such as if one of the left and right plate springs breaks, the damaged plate spring does not achieve a designed supporting function, and one crosswise direction end portion of the cross beam moves downward beyond expectation. There may be a case where: a large number of plate springs are stacked in the upper-lower direction; and even if a part of the plate springs are damaged, the rest of the plate springs ensure the adequate supporting function. However, in such a case, a space occupied by the plate springs in the upper-lower direction (thickness direction of the plate spring) becomes large, so that it becomes difficult to respond to demands, such as the realization of the low floor of the carbody.

Here, an object of the present invention is to, even if the plate spring is, for example, damaged, ensure the function of the plate spring while reducing an occupied space of the plate spring in a thickness direction of the plate spring.

Solution to Problem

A plate spring unit according to the present invention is a plate spring unit applicable to a railcar bogie, the railcar bogie including: a cross beam configured to support a carbody of a railcar; a pair of front and rear axles between which the cross beam is located and which are respectively arranged in front of and behind the cross beam in a railcar longitudinal direction so as to extend in a railcar width direction; bearings respectively provided at both railcar width direction sides of each of the axles and configured to rotatably support the axles; and axle boxes configured to respectively accommodate the bearings, the plate spring unit including a plurality of plate springs that extend in the railcar longitudinal direction so as to support one of both railcar width direction end portions of the cross beam, each includes both railcar longitudinal direction end portions respectively supported by the axle boxes, and elastically deform in a thickness direction that is an upper-lower direction, wherein the plurality of plate springs are arranged so as to be lined up in a width direction perpendicular to the longitudinal direction and the thickness direction.

Further, a railcar bogie of the present invention includes: a cross beam configured to support a carbody of a railcar; a pair of front and rear axles between which the cross beam is located and which are respectively arranged in front of and behind the cross beam in a railcar longitudinal direction so as to extend in a railcar width direction; bearings respectively provided at both railcar width direction sides of each of the axles and configured to rotatably support the axles; axle boxes configured to respectively accommodate the bearings; and a plate spring unit configured to extend in the railcar longitudinal direction so as to support one of both railcar width direction end portions of the cross beam and including both longitudinal direction end portions respectively supported by the axle boxes, wherein: the plate spring unit includes a plurality of plate springs configured to elastically deform in a thickness direction that is an upper-lower direction; and the plurality of plate springs are arranged so as to be lined up in a width direction perpendicular to the longitudinal direction and the thickness direction.

According to each of the above configurations, the plurality of plate springs constituting the plate spring unit are lined up in the width direction, not the thickness direction that is the upper-lower direction of the plate spring unit. Therefore, the occupied space of the plate spring unit in the upper-lower direction can be prevented from increasing. Then, the plate spring unit is divided into a plurality of plate springs along the longitudinal direction, so that even if one of the plate springs is, for example, damaged, the other plate spring(s) can ensure the function of the plate spring unit.

Advantageous Effects of Invention

As is clear from the above explanations, according to the present invention, the occupied space of the plate spring unit in the upper-lower direction can be reduced, and even if the plate spring is, for example, damaged, the function of the plate spring can be ensured.

DESCRIPTION OF EMBODIMENTS

Hereinafter, embodiments will be explained in reference to the drawings.

Embodiment 1

Figure 1:
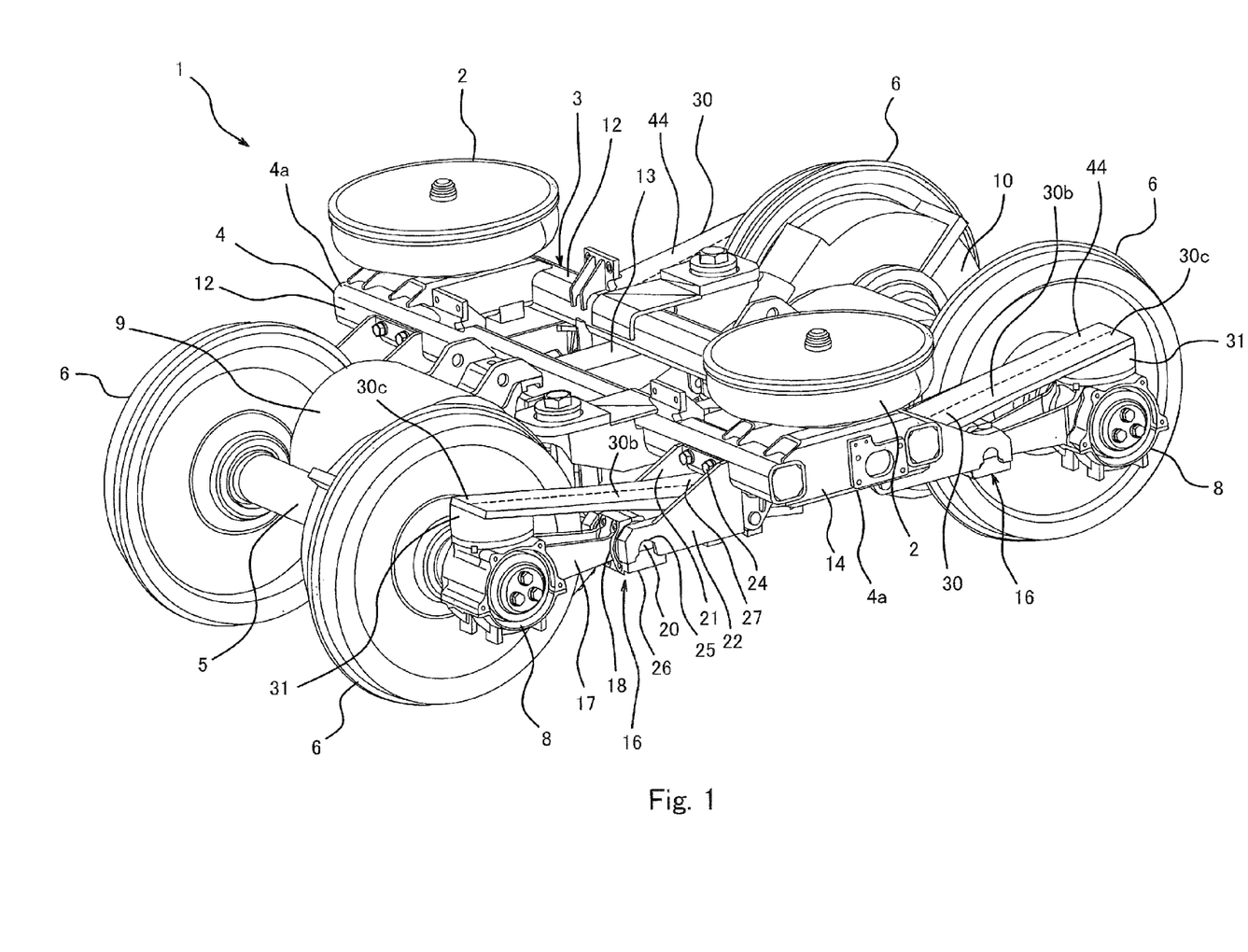
FIG. 1 is a perspective view showing a railcar bogie according to Embodiment 1.
Figure 2:
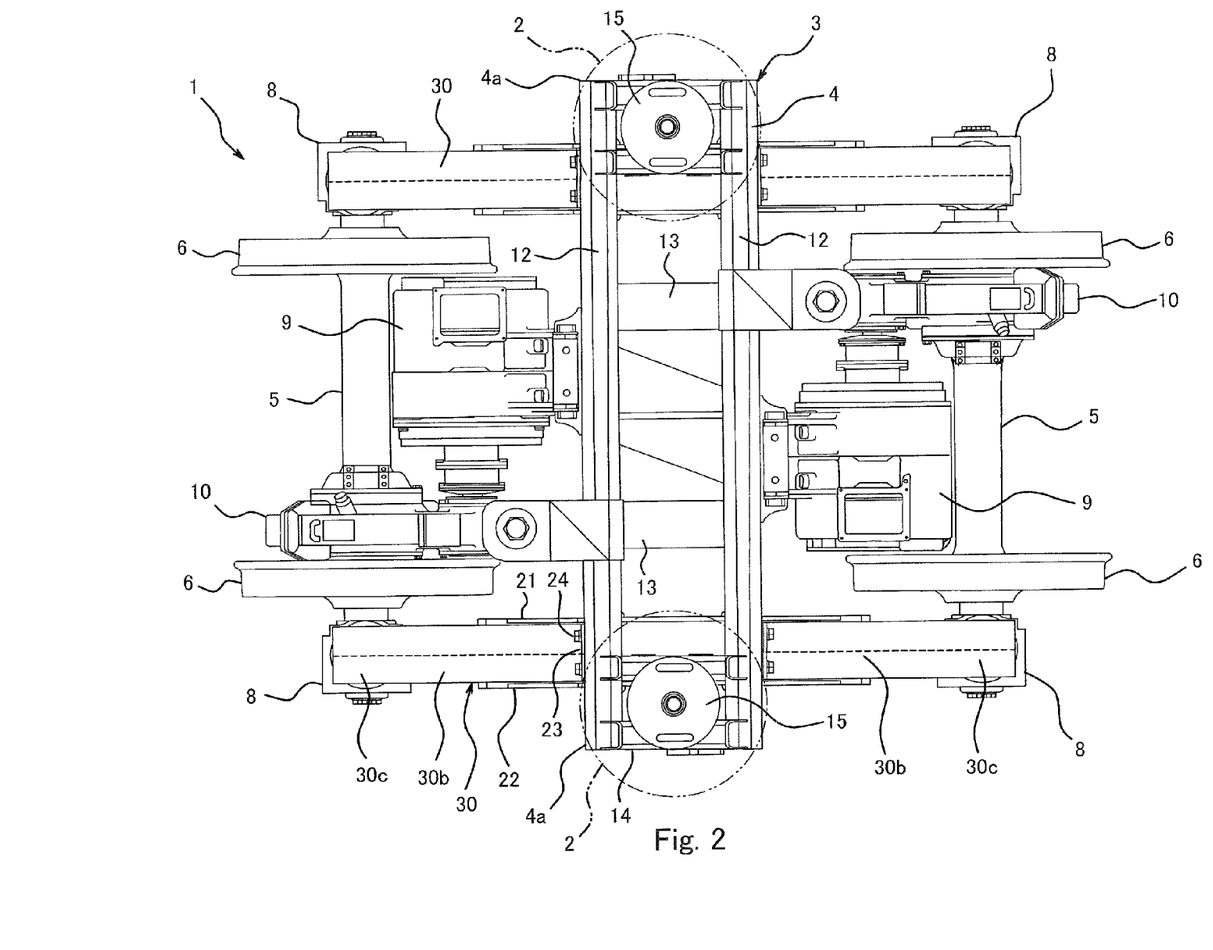
FIG. 2 is a plan view of the bogie shown in FIG. 1.
Figure 3:
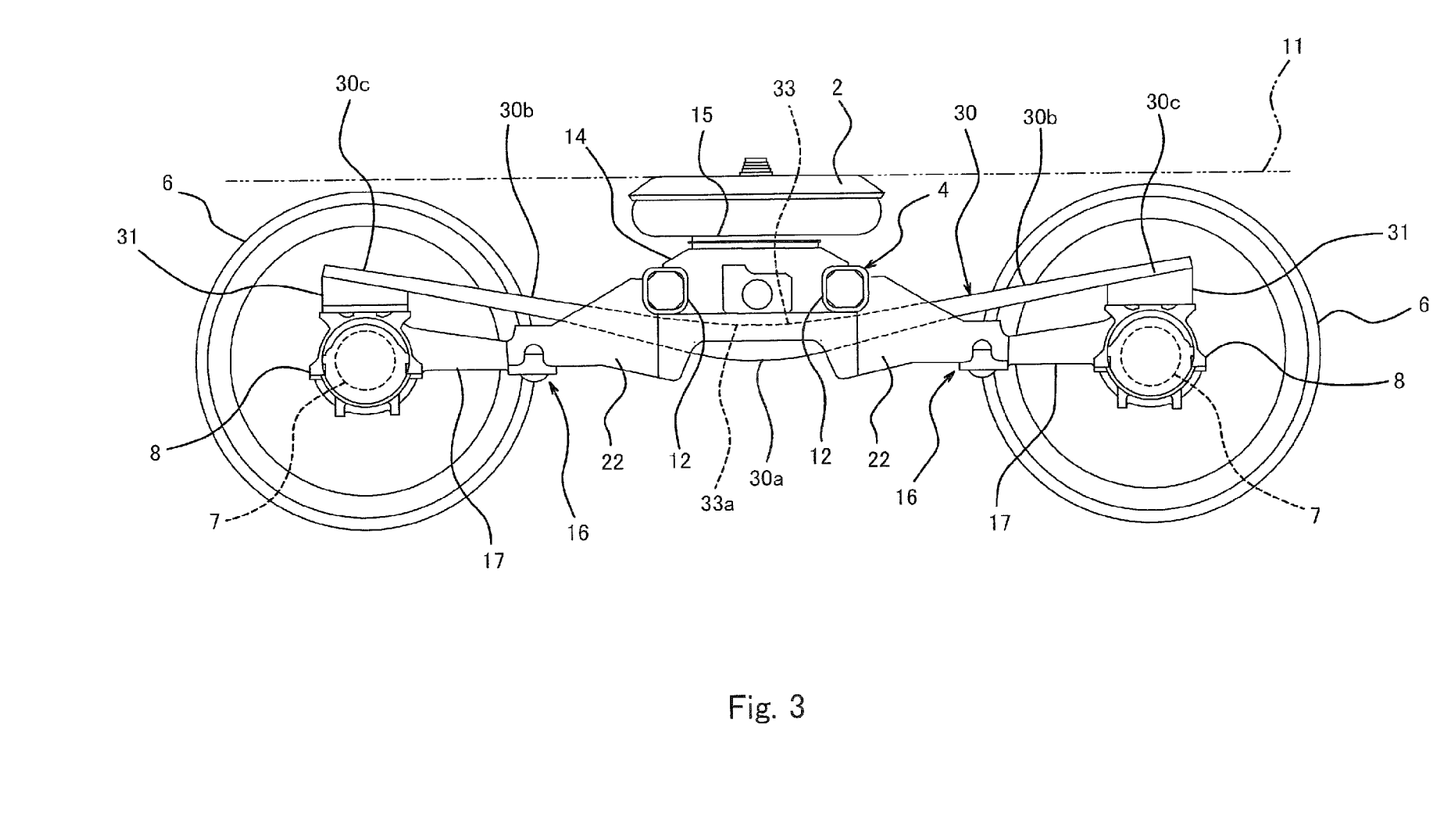
FIG. 3 is a side view of the bogie shown in FIG. 1.

FIG. 1 is a perspective view showing a railcar bogie 1 according to Embodiment 1. FIG. 2 is a plan view of the bogie 1 shown in FIG. 1. FIG. 3 is a side view of the bogie 1 shown in FIG. 1. As shown in FIGS. 1 to 3, the railcar bogie 1 includes a bogie frame 3 configured to support a carbody 11 via air springs 2 serving as secondary suspensions. The bogie frame 3 includes a cross beam 4 extending in a railcar width direction (hereinafter may be simply referred to as a "width direction") that is a left-right direction. However, the bogie frame 3 does not include side sills respectively extending from both railcar width direction end portions of the cross beam 4 in a railcar longitudinal direction (hereinafter may be referred to as a "front-rear direction"). A pair of front and rear axles 5 are respectively arranged in front of and behind the cross beam 4 so as to extend in the railcar width direction. Wheels 6 are respectively fixed to both railcar width direction sides of each axle 5. Bearings 7 configured to rotatably support the axle 5 are respectively provided at both railcar width direction end portions of the axle 5 so as to be respectively located outside the wheels 6 in the railcar width direction. The bearings 7 are respectively accommodated in axle boxes 8. Electric motors 9 are attached to the cross beam 4, and gear boxes 10 each of which accommodates a reduction gear configured to transmit power to the axle 5 are respectively connected to output shafts of the electric motors 9.

The cross beam 4 includes: a pair of square pipes 12 extending in the railcar width direction; and connecting plates 13 and 14 connecting the square pipes 12. The connecting plates 13 and 14 are fixed to the square pipes 12 by bolts, or the like. A pair of tubular connecting plates 14 are provided at each of railcar width direction end portions 4a of the cross beam 4 so as to be spaced apart from each other. Each of air spring bases 15 is disposed on upper surfaces of the pair of connecting plates 14. Each of the railcar width direction end portions 4a of the cross beam 4 is coupled to the axle boxes 8 by coupling mechanisms 16. Each of the coupling mechanisms 16 includes an axle beam 17 extending in the front-rear direction integrally from the axle box 8. A tubular portion 18 that has a cylindrical inner peripheral surface and opens at both railcar width direction sides thereof is provided at an end portion of each axle beam 17.

A core rod 20 is inserted through an internal space of each tubular portion 18 via a rubber bushing (not shown). Two pairs of receiving seats 21 and 22 constituting the coupling mechanisms 16 are provided at each railcar width direction end portion 4a of the cross beam 4 so as to project in the front-rear direction. A fitting groove 25 that opens downward is formed at each of the receiving seats 21 and 22. Both crosswise direction end portions of the core rod 20 are respectively fitted into the fitting grooves 25 of the receiving seats 21 and 22 from below. In this state, a lid member 26 is fixed to the receiving seats 21 and 22 by bolts (not shown) from below so as to close lower openings of the fitting grooves 25 of the receiving seats 21 and 22. Thus, the core rod 20 is supported by the lid member 26 from below.

Each of plate spring units 30 extending in the front-rear direction is provided between the cross beam 4 and the axle box 8. Longitudinal middle portions 30a of the plate spring units 30 respectively support the railcar width direction end portions 4a of the cross beam 4, and longitudinal direction end portions 30c of the plate spring units 30 are respectively supported by the axle boxes 8. To be specific, each of the plate spring units 30 serves as both a primary suspension and a conventional side sill. The longitudinal direction middle portions 30a of the plate spring units 30 are arranged under the cross beam 4. Contact members 33 each having a circular-arc lower surface 33a are respectively provided under both railcar width direction end portions 4a of the cross beam 4. The contact members 33 are respectively disposed on the longitudinal direction middle portions 30a of the plate spring units 30 from above to respectively, freely contact the longitudinal direction middle portions 30a. To be specific, each of the contact members 33 contacts an upper surface of the plate spring unit 30 by downward load from the cross beam 4 due to gravity so as not to fix the plate spring unit 30 in the upper-lower direction.

Supporting members 31 are respectively attached to upper end portions of the axle boxes 8, and the longitudinal direction end portions 30c of the plate spring units 30 are respectively supported by the supporting members 31 from below. The longitudinal direction end portions 30c of the plate spring units 30 are respectively disposed on the supporting members 31 from above to respectively, freely contact upper surfaces of the supporting members 31 by the downward load form the plate spring units 30.

In the plate spring unit 30, each of extending portions 30b each extending between the longitudinal direction middle portion 30a and the longitudinal direction end portion 30c is inclined downward toward the longitudinal direction middle portion 30a in a side view. The longitudinal direction middle portion 30a of the plate spring unit 30 is located at a position lower than the longitudinal direction end portion 30c of the plate spring unit 30. To be specific, each of the plate spring units 30 is formed in a bow shape that is convex downward as a whole in a side view. A part of the extending portion 30b of the plate spring 30 extends through a space 27 sandwiched between a pair of receiving seats 21 and 22 and then extends under the coupling plate 23 to reach a position under the cross beam 4. To be specific, a part of the extending portion 30b of the plate spring unit 30 is arranged so as to overlap the coupling mechanism 16 in a side view.

Figure 4:
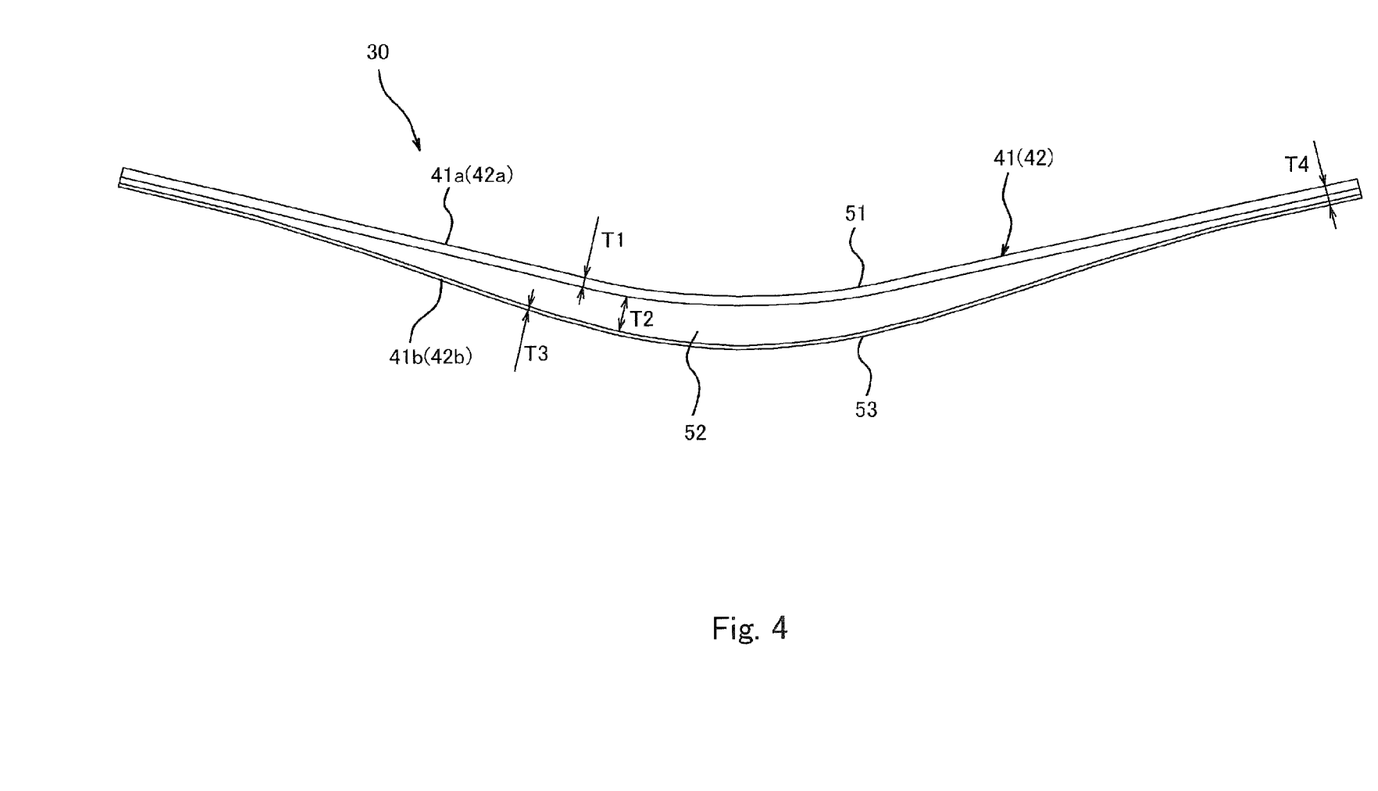
FIG. 4 is a side view of a plate spring unit shown in FIG. 1.
Figure 5:
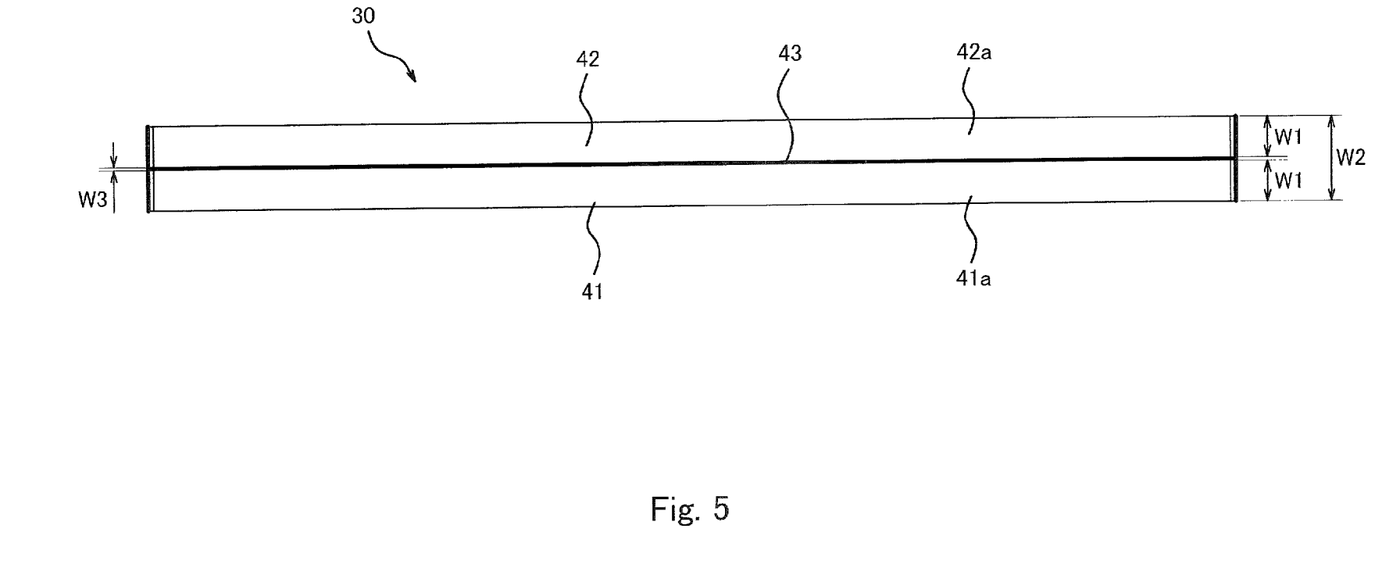
FIG. 5 is a plan view of the plate spring unit shown in FIG. 4.
Figure 6:
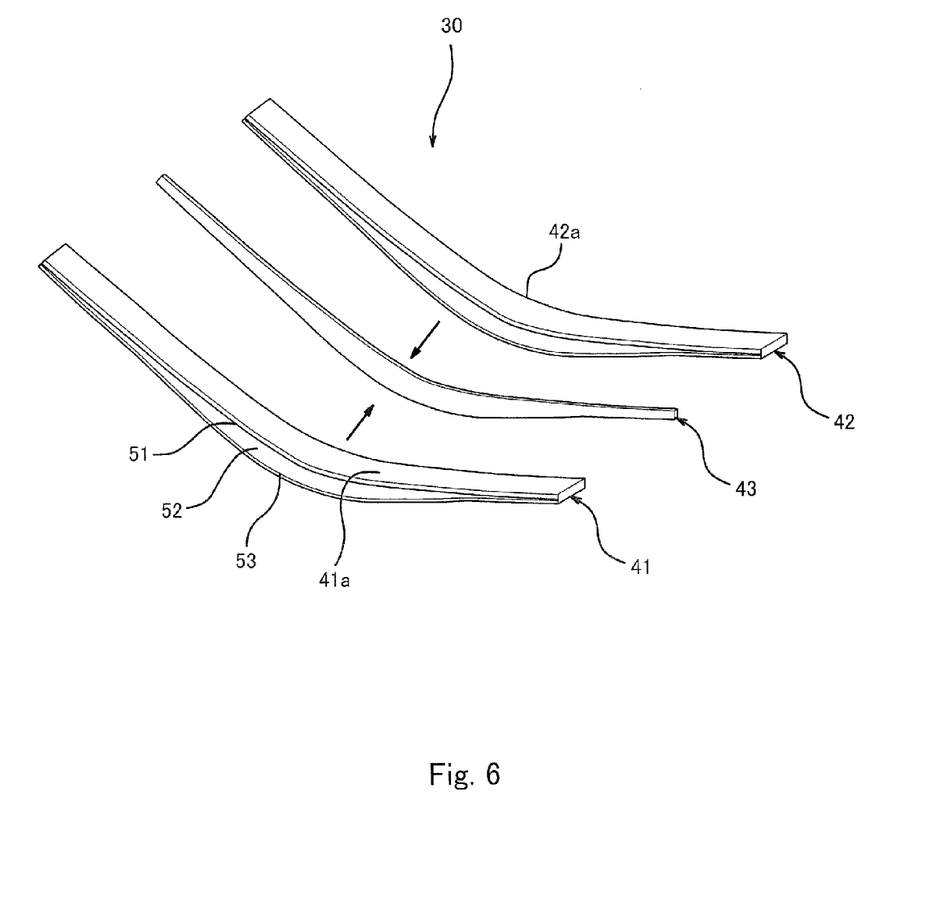
FIG. 6 is an exploded perspective view of the plate spring unit shown in FIG. 4.

FIG. 4 is a side view of the plate spring unit 30 shown in FIG. 1. FIG. 5 is a plan view of the plate spring unit 30 shown in FIG. 4. FIG. 6 is an exploded perspective view of the plate spring unit 30 shown in FIG. 4. A below-described outer cover 44 (see FIG. 1) is not shown in FIGS. 4 to 6. As shown in FIGS. 4 to 6, the plate spring unit 30 includes a pair of plate springs 41 and 42 that elastically deform in a thickness direction (upper-lower direction) of the plate spring unit 30. The plate springs 41 and 42 are arranged so as to be lined up in the width direction (left-right direction) perpendicular to the longitudinal direction (front-rear direction) and the thickness direction. The plate springs 41 and 42 are the same as each other, that is, the same in material, configuration, outer shape, and size as each other. In the present embodiment, the number of plate springs is two. However, the present embodiment is not limited to this. A spring constant of the plate spring unit can be adjusted by changing the number of plate springs lined up in the width direction. For example, in a case where the spring constant of one plate spring is 50 kg/mm, the spring constant of the plate spring unit including two plate springs is 100 kg/mm, and the spring constant of the plate spring unit including three plate springs is 150 kg/mm.

An interposed member 43 that is lower in hardness than the plate springs 41 and 42 is interposed between the plate springs 41 and 42. The interposed member 43 is a rubber sheet. A width W3 (sheet thickness) of the interposed member 43 in the railcar width direction is much smaller than a width W1 of each of the plate springs 41 and 42. The interposed member 43 is sandwiched between the plate springs 41 and 42 such that both surfaces thereof respectively contact opposing surfaces of the plate springs 41 and 42. The interposed member 43 is formed in such a shape that corresponds to contours of side surfaces (opposing surfaces) of the plate springs 41 and 42. In the present embodiment, the shape of the interposed member 43 is substantially the same as the shape of each of the side surfaces (opposing surfaces) of the plate springs 41 and 42. The material of the interposed member 43 may be any material as long as it is lower in hardness than the plate springs 41 and 42. The interposed member 43 is not limited to the rubber sheet.

In a state where the interposed member 43 is sandwiched between the plate springs 41 and 42, the plate springs 41 and 42 and the interposed member 43 are enclosed with the outer cover 44 (see FIG. 1) that is a holding member. To be specific, the outer cover 44 covers the entire surface of an assembly configured such that the plate springs 41 and 42 sandwich the interposed member 43. The interposed member 43 enclosed with the outer cover 44 together with the plate springs 41 and 42 is not adhered to the plate springs 41 and 42 but just contacts the plate springs 41 and 42. The outer cover 44 may be any member as long as it has flexibility and can hold the plate springs 41 and 42 and the interposed member 43. Examples of the outer cover 44 include a non-flammable cloth and a heat shrinkable tube.

Each of the plate springs 41 and 42 is formed in a bow shape that is convex downward as a whole in a side view. Therefore, an upper surface 41*a* and lower surface 41*b* of the plate spring 41 are different in shape from each other, and an upper surface 42*a* and lower surface 42*b* of the plate spring 42 are different in shape from each other. Each of the plate springs 41 and 42 includes an upper layer 51, an intermediate layer 52, and a lower layer 53 and is formed by compounding different types of fiber-reinforced resins. The volume of the intermediate layer 52 is larger than the total of the volumes of the upper layer 51 and the lower layer 53. The upper layer 51 and the lower layer 53 are made of Carbon-Fiber-Reinforced Plastic (CFRP), and the intermediate layer 52 is made of Glass-Fiber-Reinforced Plastic (GFRP). The CFRP is higher in tensile strength or compressive strength than the GFRP, and the GFRP is lower in cost than the CFRP.

A thickness T4 of each of the plate springs 41 and 42 is the largest at a longitudinal direction middle portion thereof and gradually decreases toward both longitudinal direction end portions thereof. Specifically, a thickness T2 of the intermediate layer 52 is formed to gradually decrease from a longitudinal direction middle portion thereof toward both longitudinal direction end portions thereof. A thickness T1 of the upper layer 51 and a thickness T3 of the lower layer 53 are constant. When the plate springs 41 and 42 elastically deform by the downward load applied from the cross beam 4, the compressive load and the tensile load are respectively applied to the upper layer 51 and the lower layer 53 in the longitudinal direction of the plate springs 41 and 42. Since the tensile strength of the FRP is higher than the compressive strength of the FPR, the thickness T3 of the lower layer 53 is thinner than the thickness T1 of the upper layer 51.

The width W1 of each of the plate springs 41 and 42 is larger than the thickness T4 of a thinnest portion (each of both longitudinal direction end portions) of each of the plate springs 41 and 42. A thickness T5 of the interposed member 43 is 2% to 20% of the width W1 of each of the plate springs 41 and 42. With this, the thickness T4 of the entire plate spring unit 30 is prevented from becoming too large, and the width W2 of the entire plate spring unit 30 is also prevented from becoming too large. To protect the plate springs 41 and 42 from ultraviolet rays, surfaces of the plate springs 41 and 42 are subjected to painting (not shown).

According to the above configuration, the plate springs 41 and 42 constituting the plate spring unit 30 and separated along the longitudinal direction are lined up in the width direction of the plate spring unit 30, not the thickness direction of the plate spring unit 30. Therefore, the occupied space of the plate spring unit 30 in the thickness direction (that is, a height direction of the bogie 1) can be prevented from increasing. This can contribute to, for example, the realization of the low floor of the carbody 11. The plate spring unit 30 is divided into the plate springs 41 and 42, so that even if the plate spring 41 is, for example, damaged, the plate spring 42 can ensure the function of the plate spring unit 30.

In a case where the upper surfaces 41*a* and 42*a* and lower surfaces 41*b* and 42*b* of the plate springs 41 and 42 are different in shape (for example, a curved shape or a tapered shape) from each other, the plate springs 41 and 42 cannot be stacked on each other in the upper-lower direction. However, since the plate springs 41 and 42 are lined up in the width direction, not the upper-lower direction (thickness direction), the plate springs 41 and 42 can be configured as the same springs. Therefore, it becomes unnecessary to design and produce plural types of plate springs in accordance with respective positions and behaviors. Thus, the design efficiency and the production efficiency can be improved.

Further, since the rubber sheet as the interposed member 43 lower in hardness than the plate springs 41 and 42 is interposed between the plate springs 41 and 42, the plate springs 41 and 42 are prevented from rubbing against each other. Thus, the plate springs 41 and 42 can be protected. The interposed member 43 has a sheet shape and is arranged such that a direction of the thickness T5 thereof coincides with a direction of the width W1 of each of the plate springs 41 and 42. Therefore, the thickness T4 and width W2 of the entire plate spring unit 30 can be prevented from becoming too large.

Since the plate springs 41 and 42 and the interposed member 43 are enclosed with the outer cover 44 to be held by the outer cover 44, the plate spring unit 30 can be easily handled. In addition, the position of the interposed member 43 is held by the outer cover 44 without causing the interposed member 43 to be adhered to the plate springs 41 and 42. Therefore, an adhering work and the use of an adhesive can be omitted. The position of the interposed member 43 relative to the plate springs 41 and 42 can be held in such a manner that: the outer cover 44 is omitted; and the interposed member 43 is adhered to the plate springs 41 and 42.

Embodiment 2

Figure 7:
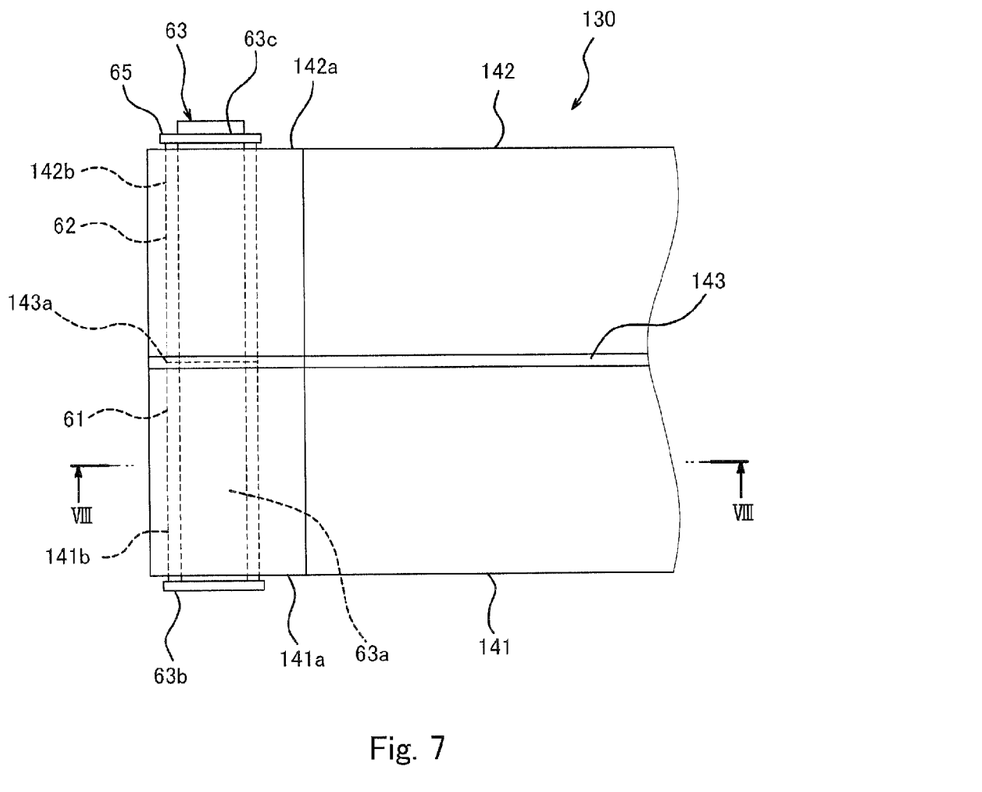
FIG. 7 is a plan view showing major components of the plate spring unit according to Embodiment 2.
Figure 8:
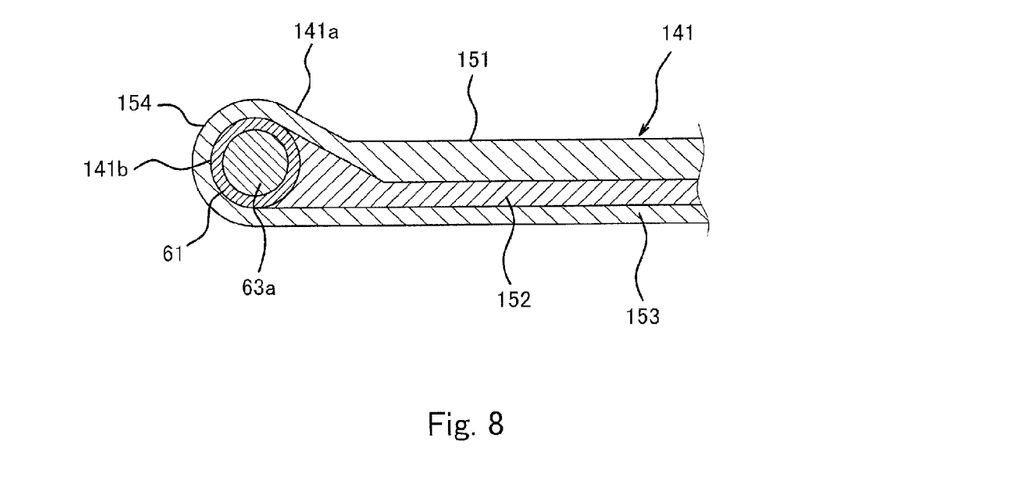
FIG. 8 is a cross-sectional view taken along line VIII-VIII of FIG. 7.

FIG. 7 is a plan view showing major components of a plate spring unit 130 according to Embodiment 2. FIG. 8 is a cross-sectional view taken along line VIII-VIII of FIG. 7. As shown in FIGS. 7 and 8, in the plate spring unit 130 of the present embodiment, plate springs 141 and 142 lined up in the width direction respectively include insertion holes 141b and 142b respectively penetrating longitudinal direction end portions 141a and 142a of the plate springs 141 and 142 in the width direction. A pin 63 as a holding member is inserted through the insertion holes 141b and 142b. Thus, the plate springs 141 and 142 are coupled to and held by each other.

Specifically, each of the plate springs 141 and 142 includes an upper layer 151, an intermediate layer 152, and a lower layer 153. Further, each of the plate springs 141 and 142 includes an end edge portion 154 that connects the upper layer 151 and the lower layer 153 at the longitudinal direction end portion 141a or 142a. The end edge portion 154 has a circular-arc shape that curves so as to bulge outward in the longitudinal direction of the plate spring 141 or 142. Each of an insertion holes 141b and 142b each having a circular cross section is formed by an inner peripheral surface of the circular-arc end edge portion 154 and a longitudinal direction end edge of the intermediate layer 152. The upper layer 151, the lower layer 153, and the end edge portion 154 are made of CFRP, and the intermediate layer 152 is made of GFRP.

Metal cylindrical collars 61 and 62 are respectively inserted through the insertion holes 141b and 142b. In the present example, the collars 61 and 62 are respectively integrated with the plate springs 141 and 142 by insert molding. The collars 61 and 62 respectively project from the insertion holes 141b and 142b of the plate springs 141 and 142 toward both sides in the width direction. Since the collar 61 of the plate spring 141 and the collar 62 of the plate spring 142 contact each other, a gap is formed between the plate spring 141 and the plate spring 142, and an interposed member 143 constituted by a rubber sheet or the like is arranged at the gap. An insertion hole 143a through which the collars 61 and 62 and the pin 63 are inserted is formed on each of both longitudinal direction end portions of the interposed member 143.

The pin 63 includes: a shaft portion 63a located in the insertion holes 141b and 142b via the collars 61 and 62; a head portion 63b provided at one end of the shaft portion 63a and larger in diameter than the shaft portion 63a; and an annular groove portion 63c formed on an outer peripheral surface of the other end of the shaft portion 63a. A stopper member 65 (such as a C ring) is fitted in the groove portion 63c. The stopper member 65 and the head portion 63b prevent the pin 63 from coming out.

According to the above configuration, the plate springs 141 and 142 and the interposed member 143 can be easily held, and the thickness of the plate spring unit 130 can be reduced since the outer cover is not used. In addition, since the plate springs 141 and 142 can relatively rotate around an axis of the pin 63, mutual load transfer between the plate springs 141 and 142 can be reduced, so that the independence of the plate springs 141 and 142 can be improved. Since the collars 61 and 62 are provided to secure a predetermined gap between the adjacent plate springs 141 and 142, a load that is equal to or higher than a predetermined load in the width direction can be prevented from being applied to the interposed member 143. Since the other components are the same as those of Embodiment 1, explanations thereof are omitted.

The present invention is not limited to the above embodiments, and modifications, additions, and eliminations may be made within the scope of the present invention. The above embodiments may be combined arbitrarily. For example, a part of components or methods in one embodiment may be applied to the other embodiment. The interposed member may be adhered to one of the adjacent plate springs. The holding member that holds the adjacent plate springs to prevent the adjacent plate springs from being separated from each other by a predetermined distance or more is not limited to an outer cover, a pin, an adhesive, and the like. For example, a clamp member that holds the plate springs and the interposed member together at a position in the longitudinal direction may be used. The interposed member may be adhered to the adjacent plate spring while using the outer cover.

INDUSTRIAL APPLICABILITY

As above, each of the plate spring unit according to the present invention and the railcar bogie using the plate spring has an excellent effect of being able to reduce the occupied space of the plate spring in the thickness direction and ensure the function of the plate spring even if the plate spring is, for example, damaged. Thus, it is useful to widely apply the present invention to the railcar bogies that can utilize the significance of the above effect.

REFERENCE SIGNS LIST 1 railcar bogie
4 cross beam
4a both railcar width direction end portions
5 axle
7 bearing
8 axle box
11 carbody
30, 130 plate spring
30a longitudinal direction middle portion
30c both longitudinal direction end portions
41, 42, 141, 142 plate spring
43, 143 interposed member
44 outer cover (holding member)
51, 151 upper layer
52, 152 intermediate layer
53, 153 lower layer

The invention claimed is:

1. A plate spring unit applicable to a railcar bogie,
the railcar bogie including:
   a cross beam configured to support a carbody of a railcar, the cross beam including a pair of railcar width direction end portions;
   a pair of front and rear axles between which the cross beam is located, the pair of front and rear axles being respectively arranged in front of and behind the cross beam in a railcar longitudinal direction so as to extend in a railcar width direction;
   a plurality of bearings respectively provided at both railcar width direction sides of each of the axles, the plurality of bearings being configured to rotatably support the axles; and
   a plurality of axle boxes configured to respectively accommodate the bearings,
the plate spring unit comprising:

a plurality of plate springs extending in the railcar longitudinal direction, the plurality of plate springs respectively supporting one of the railcar width direction end portions of the cross beam, each of the plurality of plate springs including railcar longitudinal direction end portions that are respectively supported by the plurality of axle boxes, each of the plurality of plate springs elastically deforming in a thickness direction that is an upper-lower direction of the railcar bogie, and the plurality of plate springs being arranged side-by-side in a width direction of the railcar bogie that is perpendicular to the longitudinal direction and the thickness direction; and an interposed member interposed between two of the plurality of plate springs, the interposed member having a lower hardness than the plurality of plate springs.

2. The plate spring unit according to claim 1, wherein:
an upper surface and a lower surface of each of the plurality of plate springs are different in shape from each other; and
the plurality of plate springs are substantially similar in outer shape and size from one another.

3. The plate spring unit according to claim 1, wherein:
the interposed member has a sheet shape; and
the interposed member is sandwiched between opposing surfaces of the two of the plurality of plate springs such that both surfaces of the interposed member respectively contact the opposing surfaces.

4. The plate spring unit according to claim 1, wherein the interposed member is made of rubber.

5. The plate spring unit according to claim 1, further comprising a holding member configured to hold the plurality of plate springs together, wherein
the interposed member held by the holding member together with the plurality of plate springs contacts the plurality of plate springs without being adhered to the plurality of plate springs.

6. The plate spring unit according to claim 1, wherein the interposed member is adhered to at least one of the plurality of plate springs, the at least one plate spring of the plurality of plate springs being located adjacent to the interposed member.

7. The plate spring unit according to claim 1, wherein:
each of the plurality of plate springs includes at least an upper layer, an intermediate layer, and a lower layer;
the upper layer and the lower layer of each of the plurality of plate springs are made of first fiber reinforced plastic (FRP);
the intermediate layer of each of the plurality of plate springs is made of second FRP; and
a load intensity of the first FRP in the longitudinal direction is higher than a load intensity of the second FRP in the longitudinal direction.

8. A railcar bogie comprising:
a cross beam configured to support a carbody of a railcar, the cross beam including a pair of railcar width direction end portions:
a pair of front and rear axles between which the cross beam is located, the pair of front and rear axles being respectively arranged in front of and behind the cross beam in a railcar longitudinal direction so as to extend in a railcar width direction;
a plurality of bearings respectively provided at both railcar width direction sides of each of the axles, the plurality of bearings being configured to rotatably support the axles;
a plurality of axle boxes configured to respectively accommodate the bearings; and
a plate spring unit configured to extend in the railcar longitudinal direction so as to support one of the railcar width direction end portions of the cross beam, the plate spring unit including railcar longitudinal direction end portions respectively supported by the plurality of axle boxes, the plate spring unit including:
a plurality of plate springs configured to elastically deform in a thickness direction that is an upper-lower direction of the railcar bogie, and the plurality of plate springs being arranged side-by-side in a width direction of the railcar bogie that is perpendicular to the longitudinal direction and the thickness direction; and
an interposed member interposed between the two of plurality of plate springs, the interposed member having a lower hardness than the plurality of plate springs.

* * * * *